Oct. 30, 1923.  
W. L. LINDGREN  
CLUTCH  
Filed March 18, 1922  
1,472,480
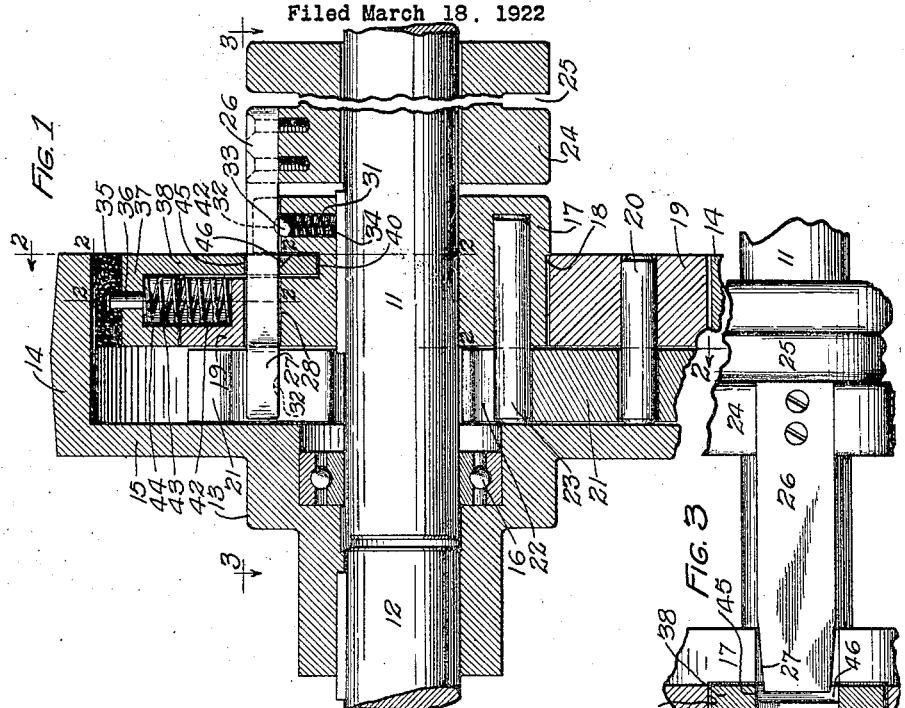

Patented Oct. 30, 1923.

1,472,480

UNITED STATES PATENT OFFICE.

WALDEMAR L. LINDGREN, OF CHICAGO, ILLINOIS, ASSIGNOR OF ONE-HALF TO JOHN E. ERICSSON, OF CHICAGO, ILLINOIS.

CLUTCH.

Application filed March 18, 1922. Serial No. 544,953.

*To all whom it may concern:*

Be it known that I, WALDEMAR L. LINDGREN, a citizen of the United States, and a resident of Chicago, in the county of Cook and State of Illinois, have invented certain new and useful Improvements in Clutches, of which the following is a specification.

My invention is concerned with automatic clutches to connect rotating members, and it is designed to produce a device of the class described that shall be simple in its construction, yet effective in its operation, and which shall not require extreme accuracy in its construction.

To illustrate my invention, I annex hereto a sheet of drawings, in which the same reference characters are used to designate identical parts in all the figures, of which,—

Fig. 1 is a central vertical section through a clutch embodying my invention;

Fig. 2 is a section on the line 2—2 of Fig. 1; and

Fig. 3 is a detail in section on the line 3—3 of Fig. 1.

In the specific application of my invention illustrated, 11 is the driving shaft journaled in suitable bearings, and which is shown as substantially abutting the driven shaft 12, which has the driven member 13 fixed thereon, the body of said driven member consisting of an annular portion 14, which might be used as a belt pulley and which is connected to the hub 13 by the disk portion 15. A set of ball bearings 16 may be interposed between the hub portion of the driven member and the adjacent end of the driving shaft 11. Rigidly secured on the driving shaft 11 is the short sleeve 17, which has a slightly reduced inner portion forming the annular shoulder 18 on its periphery which shoulder cooperates with the inner periphery of the ring 19 held in place thereby between it and the annulus 14. This ring 19 has secured therein and extending inwardly therefrom the three pins 20, which serve as fulcrums for the three short clutch levers or dogs 21, which have their inner ends slotted, as seen at 22, to receive the three pins 23 secured in the sleeve 17 and extending inwardly into the slots 22. The outer ends of the dogs 21 are eccentric to their fulcrum pins 20, although concentric to the driving shaft 11, so that when said dogs are swung in either direction from the neutral position shown in Fig. 2, they will clutch the inner surface of the annulus 14, and it will be obvious that with the mechanism thus far described, when the shaft 11 is started to rotate in either direction, the pins 23 will swing the dogs 21 so as to clutch the annulus 14 to the sleeve 17, thus insuring the shaft 12 rotating with the shaft 11.

Some means must be provided for unclutching the dogs 21 whenever it may be desired, and for this purpose I provide the shifting sleeve or collar 24 mounted to slide on the shaft 11, and having the annular channel 25 which is intended to receive the fork (not shown) of the customary shipper lever. Secured in the periphery of the sleeve 24 is the bar or key 26, which has its end tapered, as seen at 27, and which slides in a keyway 28 formed in the periphery of the sleeve 17, and where said sleeve 17 is reduced, also in the adjacent portion of the ring 19. When the driven shaft is clutched with the driving shaft 11, the sleeve 24 and the bar 26 are in the position shown in Fig, 3, and the dogs 21 are free to swing sufficiently in either direction to clutch the two shafts; but when they are to be unclutched, the sleeve 24 is shoved to the position shown in Fig. 1, where the wide portion of the key 26 enters the channel 28 in the sleeve 17 and the channel 30 in the ring 19. When the grooves or channels 28 and 30 in the sleeve 17 and the ring 19 are thus brought into alignment by the entry of the key 26, then the dogs are swung into their unclutching position, and the annulus 14 and the attached shaft 12 are free to stop despite the continued rotation of he shaft 11.

As it is desirable to provide some means for automatically holding the bar 26 in either its operative or its inoperative position, I preferably drill a radially extending hole 31 in the unreduced portion of the sleeve 17 and place in the adjacent face of the bar 26 a pair of recesses 32, which are shaped to co-operate with the plunger sliding in the recess 31, which plunger preferably takes the form of a ball 33 which is held yieldingly in engagement with the recess 32 by the helically-coiled expanding spring 34 interposed between the ball 33 and the shaft 11.

While the construction thus far described serves to clutch the two shafts together automatically when the driving shaft is rotated with the key 26 withdrawn, and to unclutch them when the key 26 is shoved home, yet no means are provided to slow up the ring 19 in its movement relative to the collar 17 when the key 26 is withdrawn to bring the clutch into action again. Without such means I have found that while the clutch works all right, there is sometimes a little delay in the clutch taking hold, because until the ring 19 lags relative to the collar 17, the swinging of the dogs 21 cannot take place, and as this occasional delay is sometimes objectionable to some users, in such cases I add the additional feature now to be described.

For this purpose, I employ the brake shoe 35, preferably composed of leather, and secured by the rivet 36 to the sliding bolt 37, which is preferably rectangular in cross section, and has the extension portion 38 which slides in a correspondingly shaped recess 39 formed in the face of the ring 19 and extends into the recess 40 formed by cutting out a channel in the collar 17. The ring 19 is also provided with the recess 41 extending clear through it and adapted to receive the unreduced portion 37 of the brake bolt. The ring 19 has the aperture 42 drilled therein to receive the adjacent end of the helically-coiled expanding spring 43, the other end of which extends into the opposite recess 44 drilled in the bolt 37. The extension 38 has the rectangular aperture 45 therein to permit the passage of the key 26, and to pull the brake 35 away from the interior of the annulus 14 when the key is shoved home the inner edge of the aperture 45 is provided with the beveled surface 46 which is engaged by the end of the key 26, which thus pulls the brake away from the inner periphery of the annulus 14 when the shafts are unclutched.

When the key 26 is withdrawn, to permit the clutch to act, the spring 43 immediately throws the brake 35 in engagement with the inner periphery of the annulus 14, thus slowing up the ring 19 relative to the collar 17, and causing the dogs 21 to swing instantly to the desired clutching position, thus insuring that there will be no delay whatever in the action of the clutch.

My present invention is an improvement on or modification of the invention shown in my application No. 489,681, filed August 4, 1921, for clutches, and allowed April 2, 1923.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, means for swinging the dogs to unclutching position without stopping the driving member, and means operating automatically to slow up the movement of the ring relative to the driving member when the dogs are free to move to clutching position.

2. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated relative to the ring, means for swinging the dogs to unclutching position without stopping the driving member, and brake mechanism operating automatically to slow up the movement of the ring relative to the driving member to cause the clutching action.

3. In a clutch, the combination with a rotatable driving member, of an annular driven member concentric therewith, a ring interposed between the two members and free to rotate relative to both within certain limits, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position only when the driving member is rotated, and means for swinging the dogs to unclutching position without stopping the driving member.

4. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to cooperate with said grooves, and means for sliding the tapered member in and out to force said grooves into registration or to permit their relative displacement.

5. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, means for swinging the dogs to unclutching position without stopping the driving member, and means to slow up the movement of the ring relative to the driving member when the dogs are free to swing to clutching position.

6. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, a brake carried by the ring, a spring tending to move it into engagement with the annular driven member, and a cam surface carried by the brake and engaged by the tapered member to draw the brake away from the annular driven member when the tapered member is slid in.

7. In a clutch, the combination with a rotatable driving member, of an annular driven member, concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, a brake sliding in a radial channel in the ring, a spring interposed between the brake and the ring tending to move the brake into engagement with the annular driven member, and a recess in the brake through which the tapered member passes, said recess having one surface formed as a cam and engaged by the tapered member to draw the brake away from the annular driven member when the tapered member is slid in.

8. In a clutch, the combination with a rotatable driving member, of an annular driven member concentric therewith, a ring interposed between the two members and capable of movement relative to either of them, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated by its initial movement relative to the ring, and means for swinging the dogs to unclutching position without stopping the driving member.

9. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to co-operate with said grooves, and means for sliding the tapered member in and out to force said grooves into registration or to permit their relative displacement.

10. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, and means for yieldingly holding the tapered member in either position.

11. In a clutch, the combination with a rotatable driving member, of an annular driven member concentric therewith, a ring interposed between the two members, a plurality of clutch dogs pivoted on the ring and having their clutching ends adapted to engage the inner periphery of the driven member when swung out from neutral position, a corresponding plurality of elements carried by the driving member adapted to swing the clutch dogs to clutching position when the driving member is rotated, registering grooves in the driving member and the ring, a tapered member adapted to co-operate with said grooves, means for sliding the tapered member in and out to force said grooves into registration or to permit their relative displacement, and means for yieldingly holding the tapered member in either position, said means consisting of a spring-pressed plunger carried by the driving member and co-operating with a pair of spaced recesses in the tapered member.

In witness whereof, I have hereunto set my hand this 1st day of March, 1922.

WALDEMAR L. LINDGREN.

In the presence of:
JOHN HOWARD MCELROY.